US009519708B2

(12) United States Patent
Yerrace et al.

(10) Patent No.: US 9,519,708 B2
(45) Date of Patent: Dec. 13, 2016

(54) MULTIPLE CONCURRENT AUDIO MODES (71) Applicant: Microsoft Corporation, Redmond, WA (US)

(72) Inventors: Frank Yerrace, Woodinville, WA (US); Kishore Kotteri, Bothell, WA (US); Rian Chung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 13/904,436

(22) Filed: May 29, 2013

(65) Prior Publication Data

US 2014/0358262 A1    Dec. 4, 2014

(51) Int. Cl.
G06F 17/00 (2006.01)
G06F 17/30 (2006.01)
G06F 3/16 (2006.01)

(52) U.S. Cl.
CPC ........... *G06F 17/3074* (2013.01); *G06F 3/165* (2013.01)

(58) Field of Classification Search
CPC ............................... G06F 17/162; G06F 3/165
USPC ......................................................... 700/94
See application file for complete search history.

(56) References Cited

U.S. PATENT DOCUMENTS

| 5,703,794 | A | 12/1997 | Heddle et al. |
| 7,444,194 | B2 | 10/2008 | Fay et al. |
| 8,170,701 | B1 | 5/2012 | Lu |
| 8,271,107 | B2 | 9/2012 | Bodin et al. |
| 2004/0064210 | A1* | 4/2004 | Puryear ................... G06F 3/165 700/94 |
| 2005/0277469 | A1 | 12/2005 | Pryzby et al. |
| 2008/0091851 | A1* | 4/2008 | Sierra ....................... G06F 3/16 710/22 |
| 2009/0187967 | A1 | 7/2009 | Rostaing et al. |
| 2010/0235820 | A1* | 9/2010 | Khouzam .......... H04N 21/4143 717/148 |
| 2012/0245718 | A1 | 9/2012 | Condit et al. |
| 2012/0281962 | A1 | 11/2012 | Hunt et al. |
| 2012/0310393 | A1 | 12/2012 | Stewart et al. |

OTHER PUBLICATIONS

International Search Report, International Application PCT/US2013/060492, filed Sep. 19, 2013, mailed Feb. 4, 2014.

(Continued)

*Primary Examiner* — Joseph Saunders, Jr.
(74) *Attorney, Agent, or Firm* — Sunah Lee; Dan Choi; Micky Minhas (57) ABSTRACT

Embodiments described herein include devices and processes for concurrently processing different audio streams with different hardware-based audio processing modes. A computing device for such embodiments may have multiple hardware audio signal processing modes capable of parallel execution. An operating system or audio stack thereof may manage audio paths or streams for audio sources producing respective types of audio signals. Which of the audio paths or streams will be connected with which of the hardware audio signal processing modes may be determined according to the types of the audio signals. A first hardware audio signal processing mode may be processing a first type of audio signal of a first audio path or stream while concurrently a second hardware audio signal processing mode processes a second type of audio signal of a second audio path or stream.

14 Claims, 5 Drawing Sheets

(56) References Cited

OTHER PUBLICATIONS

"IAudioEndpointVolume Interface (Windows)", Retrieved at <<http://msdn.microsoft.com/en-us/library/windows/desktop/dd370892(v=vs.85).aspx>>, Nov. 11, 2011, pp. 4.

* cited by examiner

MULTIPLE CONCURRENT AUDIO MODES

BACKGROUND

Computing devices often are equipped with specialized audio hardware for performing audio signal processing. Typically such audio hardware includes one or more digital signal processing chips or algorithms that perform signal processing on audio signals being captured or generated by a computing device. Such signal processing may cause specific audio effects such as enhancing a music signal, removing echo from a VoIP (voice over Internet Protocol) signal, reducing noise, simulating reverberation, and so forth. In some cases, such dedicated audio hardware or audio cards (often connected via a host bus) are able to provide a variety of such hardware-based signal processing modes or effects.

Previously, computing devices were unable to use more than one such hardware-based signal processing mode at a time, even when a dedicated audio signal processing device is configured with multiple of such modes. An operating system would usually handle the availability of multiple modes by alternatively shifting all audio processing (for all audio paths or streams) from one mode to another. At any given time, all audio being processed by the computing device would be processed by a same hardware-based audio signal processing mode.

This approach has shortcomings recognized only by the instant inventors. At times, different applications on a computing device may have different signal processing preferences. For example, a VoIP application might need echo cancellation processing at its input and minimal processing at its output, while at the same time a music player rendering music might need noise reduction signal processing to enhance the rendered audio, which likely introduces latency. In addition, the prior single-mode approach has prevented full utilization of audio hardware resources. Regardless of whether audio hardware has been capable of concurrent multi-mode processing, operating systems managing such hardware have not been designed to take advantage of such a capability.

Techniques related to providing concurrent multi-mode audio processing are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein include devices and processes for concurrently processing different audio streams with different hardware-based audio processing modes. A computing device for such embodiments may have multiple hardware audio signal processing modes capable of parallel execution. An operating system or audio stack thereof may manage audio paths or streams for audio sources producing respective types of audio signals. Which of the audio paths or streams will be connected with which of the hardware audio signal processing modes may be determined according to the types of the audio signals. A first hardware audio signal processing mode may be processing a first type of audio signal of a first audio path or stream while concurrently a second hardware audio signal processing mode processes a second type of audio signal of a second audio path or stream.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to providing multiple audio modes that can be concurrently applied to different audio streams. Discussion will begin with an overview of a computing device configured with audio signal processing hardware. Next, an audio stream management scheme implemented by an operating system will be discussed. Details of an audio stream stack will be described next, followed by discussion of processes performed thereby.

Figure 1:
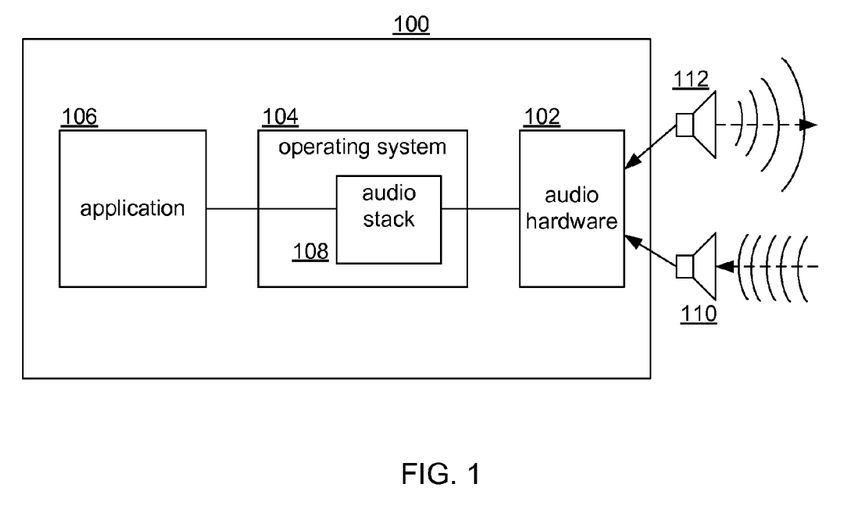
FIG. 1 shows a computing device.

FIG. 1 shows a computing device 100. The computing device 100 has audio hardware 102. Typically, audio hardware 102 is a dedicated chip or peripheral card interoperating with a central processing unit (CPU) via a system bus. The audio hardware 102 provides multiple audio signal processing modes (or effects) that may be implemented with one or more digital signal processors. Each mode implements a different audio signal processing algorithm. Following are examples of such modes that might be present on various audio processing devices: 3D audio, gaming, dynamic gain adjustment, voice, ambience, echo cancellation, sound source localization, among others. Note that modes may be for captured audio, rendered audio to be played on a speaker, or both. In addition, a mode need not necessarily transform a signal. Some modes may perform signal analysis to produce information for an application about a signal. Modes may also be for format conversion, for example, transforming bit rates, sampling rates, channel counts, or other signal features.

An operating system 104 on the computing device 100 controls access to and use of the audio hardware 102 by one or more applications 106, possibly with the use of a device driver (not shown). In particular an audio stack 108 (audio functions of the operating system 104) may manage audio pathways (also referred to as paths or streams) linking audio signals to/from applications 106 with the audio hardware 102. While implementation details will vary for different operating systems, audio streams are flows of digital audio signal data between sources and destinations. Depending on the direction of an audio stream, sources and destinations might be applications 106, microphones 110, loudspeakers 112, storage, etc. The operating system 104 may provide application programming interfaces (APIs) to enable applications 106 to invoke functionality such as initiating, reading, writing, closing, and otherwise managing audio streams. The operating system 104 may transparently perform other functions such as buffering, linking components in an audio pathway, interacting with an audio device driver to control use of and access to the audio hardware 102, etc.

Figure 2:
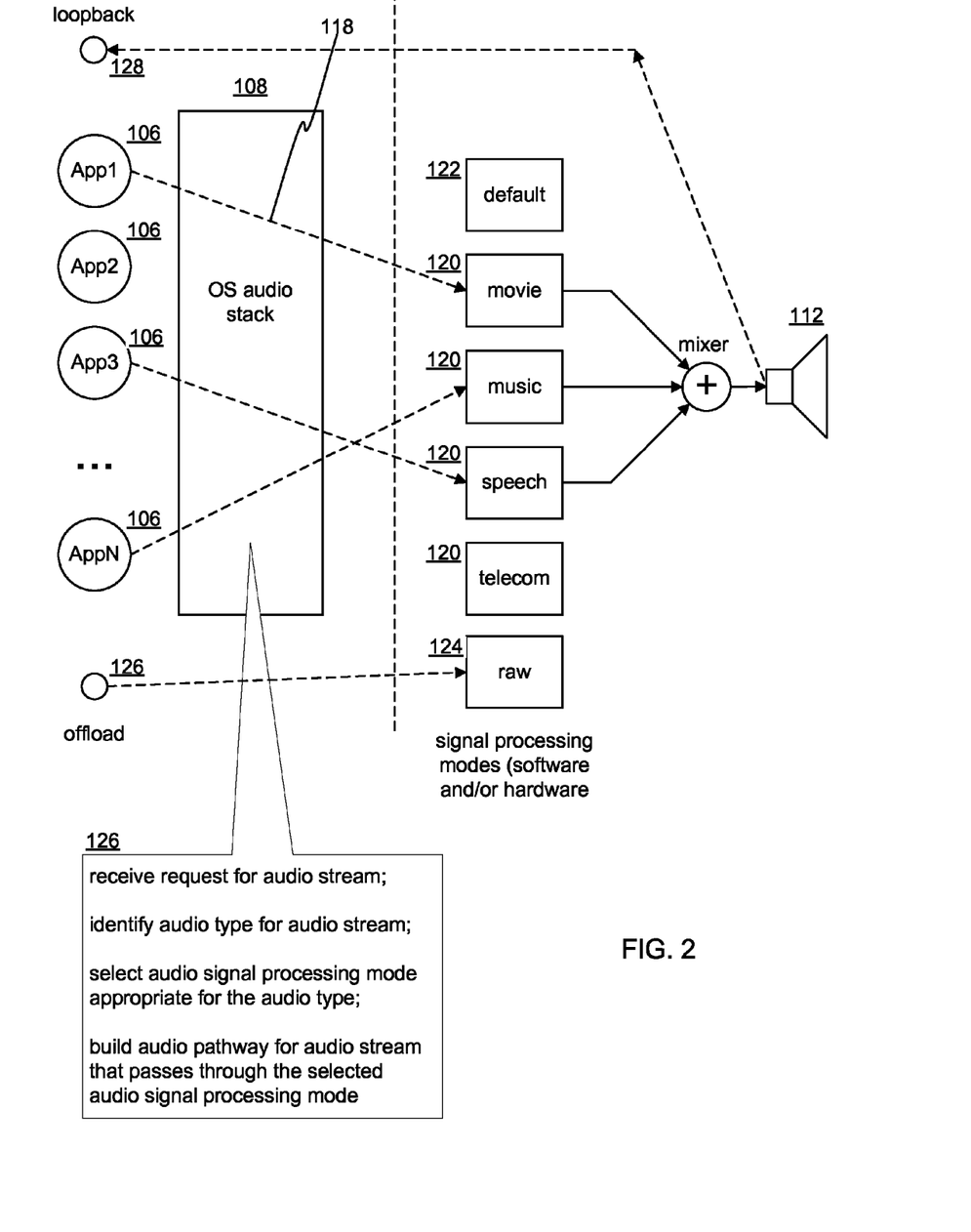
FIG. 2 shows details of audio streams concurrently processed by audio processing modes of audio hardware.

FIG. 2 shows details of audio streams 118 concurrently processed by audio processing modes 120, 122, 124 of the audio hardware 102. Some of the audio processing modes 120 may be implemented as software modules executing on a CPU of the host computing device 100. The applications 106 can be any software component executing on the computing device 106, for example user-launched applications, background services, threads a managed code environment, a virtual machine, etc. The applications 106 in the example of FIG. 2 are sound sources that are rendering sound for output on the loudspeaker 112. As discussed below with reference to FIG. 3, applications 106 can also be sound sinks; recipients of audio signal data handled and outputted by the audio stack 108.

Figure 3:
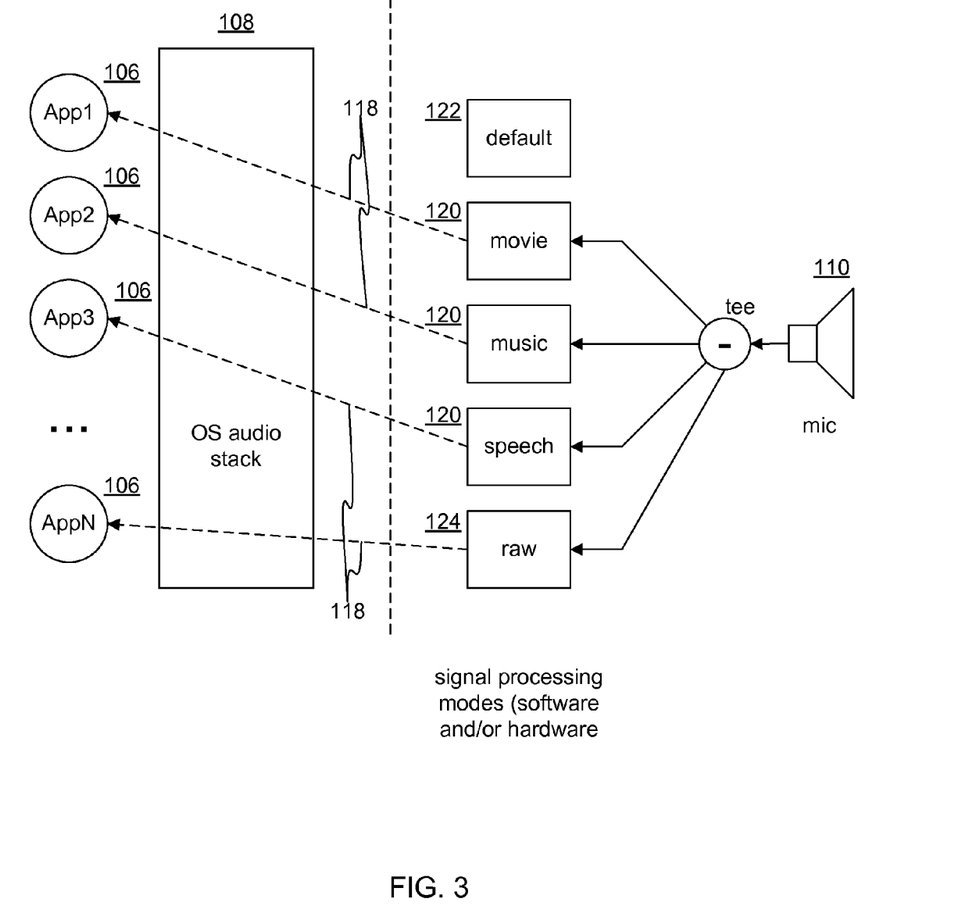
FIG. 3 shows an audio stack and applications receiving audio data through the audio stack.

It will be appreciated by those skilled in the art of audio processing systems for computing devices that forming and managing audio streams may involve complexity not depicted in FIGS. 2 and 3. For example, instances of tees for splitting signals, mixers for mixing signals, utility signal processing modules (CPU based), and possibly even multiple signal processing modes (e.g., a software-based mode and a hardware-based mode) may be combined in various ways to form complex graphs of audio data flow. Regardless of such implementation details, the operating system 104 and/or its audio stack 108 provide data pathways to enable exchange of audio signal data to/from applications 106, through the audio signal processing hardware (audio hardware 102), and in some cases from/to sound generating devices or sound capturing devices (e.g., loudspeakers 112, microphones 110).

To facilitate concurrent multi-mode audio signal processing, the audio stack 108 may perform a process such as process 126. When an application 106 needs an audio stream, for example to output sound rendered by the application 106, the application 106 issues a call or request, perhaps via an audio API, to the operating system 104. When the operating system 104 or audio stack 108 receives the request, the audio type for the requested audio stream is identified. The audio type can be ascertained by a variety of means. For example, the requesting application 106 can tag the audio stream with typing information as a parameter of the call requesting the new audio stream.

Other means of categorizing, identifying, or determining an audio type may be used. For example, an application can specify an audio type by embedding an identifier in the audio data or in the stream itself. The audio stack 108 can reference metadata associated with the requesting application 106 that identifies a type of audio associated with the application. In another embodiment, a last type of audio that the application used (or another stream in use by the application) may be referenced to determine the audio type for the new audio stream. In yet another embodiment, the audio stack 108 may setup the requested audio stream without knowing the audio type, receive some audio signal data from the application 106, buffer the audio signal data provided from the application, and analyze the buffered audio data (sound data) to determine a type of sound in the audio data (e.g., music, voice, etc.).

Returning to process 126, when the audio type of the requested audio stream is determined, an appropriate one of the audio signal processing modes 120, 122, 124, is selected for processing the new audio stream. In one embodiment, the audio stack 108 maintains association information associating audio types with the particular audio signal processing modes 120, 122, 124. Other embodiments are discussed later with reference to FIG. 4.

Regardless of how an audio signal processing mode is selected, the audio stack 108 proceeds to link the new audio stream with the selected audio signal processing mode. For example, if the application 106 is "App1", and the audio signal processing mode 120 is a "movie" type of mode, audio data generated by the application 106 flows through the audio stream, is processed by the audio signal processing mode 120 ("movie"), and is emitted as sound by the loudspeaker 112.

While one or more audio streams 118 are already carrying audio data to one or more of the audio signal processing modes, an application 106 may request yet another audio stream, again invoking process 126. The new audio stream is built and configured in the same manner as discussed above. In the event that the new audio stream employs an audio signal processing mode that is not currently in use, the requested audio stream may nonetheless be implemented according to its type. In other words, different modes may concurrently process audio signal data. The ability of the operating system 108 and/or the audio stack 104 to track and differentiate between audio stream types facilitates the concurrent processing of audio streams by different hardware-based audio signal processing modes.

Further regarding types of audio streams, the types or categories of audio streams are not limited; the types of audio streams can correspond to any characteristic or feature of an audio stream. For example, stream types can correspond to audio format traits. Streams might be labeled or tagged to indicate features such as bitrates, codec types used for encoding the audio content, buffering modes, buffer sizes, data block sizes, sampling rate, channel count, etc. Other information related to an application or its audio stream may also be used, such as information identifying a content producer corresponding to the audio content, information indicating a device used to produce the audio content, date information, and so forth.

In one embodiment an offload path 126 may be included. The offload path 126, when requested by an application, allows the application to bypass substantially all of the signal processing of the audio stack 108. An offload mode may differ from the raw mode. An offload path allows the application to talk directly to the audio device, bypassing the operating system. The audio device may provide mode specific processing in the hardware, or provide no processing at all (raw). A raw path is one which has no signal processing in its path. The raw path may be non-offload (i.e. implemented by the operating system), or may be implemented by the hardware as an offload path (where the application talks to the audio device directly, and the audio device renders the audio without applying any mode-specific processing). Usually, the only processing that exists in the raw path is the mandatory processing. Raw processing assures an application that the audio data it renders/captures will not go through any non-mandatory signal processing implemented by the operating system or the hardware.

As discussed above, the raw audio signal processing mode 124 can be requested by an application to avoid any audio effects or signal processing and to allow the corresponding audio stream to be rendered (or captured) as a raw signal. Hardware-protecting signal processing may be transparently and mandatorily applied when using the raw mode (or other modes) to address signal traits that might damage the audio hardware. The offload path 126, or other of the modes, can be implemented as a software-based mode, i.e., one that runs on the host CPU.

A default audio signal processing mode 122 may also be included. The default audio signal processing mode 122 can implement any signal processing algorithms, but preferably performs only lightweight or basic signal processing. The default audio signal processing mode 122 may be implemented to optimize sound for the particular audio hardware 102 being used. Alternatively, the default audio signal processing mode 122 can implement a signal processing standard; providing for a signal processing baseline across platforms. Regardless of the processing that default audio signal processing mode 122 performs, the fact that there is a designated default mode allows the system to have a fallback mode when a type of an audio stream is not found to have an available corresponding mode, as will be discussed with reference to FIG. 4.

In addition to the offload path 126, some embodiments may include a loopback path 128 that can be requested by applications. The loopback path 128 allows an application to receive audio data directly post-process, perhaps in the form it would have when passed to the loudspeaker 112. In other embodiments, individual loopbacks may be provided for each audio processing mode. The loopback path 128 can be useful for purposes such as echo cancellation and basic sound capturing. Note that if the audio device implements multiple signal processing modes, it might need to also provide a loopback path to return post-mix audio back to any application that requests it.

FIG. 3 shows the audio stack 108 when applications 106 are receiving audio data through the audio stack 108. The discussion of FIG. 2 is equally applicable to FIG. 3. In practice, one or more applications 106 may be both receiving and sourcing audio data via the audio streams 118. An application 106 may have both incoming and outgoing audio streams.

When multiple sound-outputting applications request audio streams that will pass through a same given audio signal processing mode, the audio stack 108 may mix their audio streams together into one submix before passing them into a signal processing path that passes through the given audio signal processing mode, which allows one audio pipeline to support multiple applications. Similarly, when several applications are receiving audio through a same mode, the audio streams may be split before being processed, and then they are split and passed to the applications.

Figure 4:
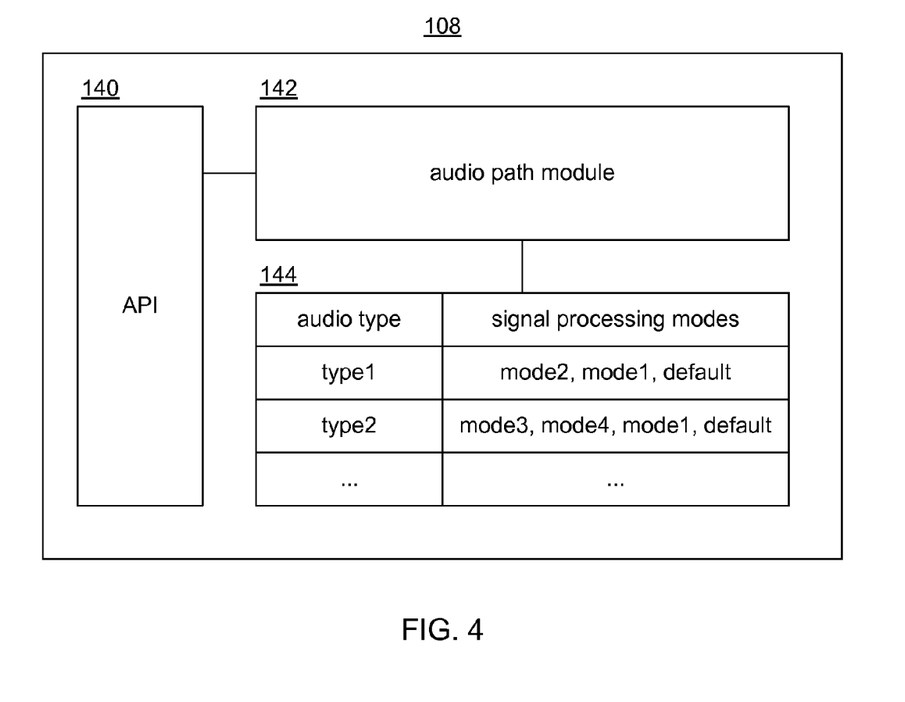
FIG. 4 shows details of the audio stack.

FIG. 4 shows details of the audio stack 108. In some embodiments, the audio stack 108 may run in kernel mode or user mode or a combination thereof. An API 140 is provided to allow applications to access the functionality of the audio stack 108. Methods or calls provided via the API 140 may include typical operating system data stream or file calls such as read, write, open, close, duplicate, etc. In addition the API 140 may have calls that allow applications to discover or enumerate available audio signal processing modes or audio types. There may be a separate call to specify a type of an audio stream, which might be called when setting up a stream or which might be callable to change a stream's audio type. The audio type might also be specified as a parameter of a stream-open call. The audio stack 108 may have logic or an audio path module 142 that handles the aforementioned functions as well as other functionality discussed above. Such an enumeration may also provide status information about the audio signal processing modes, such as whether a mode is being used, what load a mode is experiencing or rate of data is being processed, etc. This may allow an application, given a choice of similar audio types or modes, to specify a type or mode that has low load.

The audio path module 142 may also handle logic for matching audio types with audio processing modes. One implementation may use a table 144 that maps audio types to audio modes. Each audio type has a list of corresponding audio signal processing modes ordered by priority. When the audio stack 108 has determined that an audio stream has a particular audio type, such as "type1", then the audio path module 142 looks up the audio type in the table 144 and selects from the list the first mode that is available or operational. If the audio type is "type1", then "mode2" is selected, or, if "mode2" is unavailable, "mode1" is selected. The inclusion of a "default" modes may be omitted in an embodiment where the default mode is automatically selected when a stream-specific mode is either unavailable or indeterminable. In one embodiment, the table 144 or other mapping information is not used, rather, there is no distinction between audio types and audio signal processing modes, and modes or types are used directly on a one-to-one basis. In other words, the streams and modes all have the same categories or types. For example, the audio stack 108 may assign each audio signal processing mode a closest determined audio type, and applications specify modes/types directly.

Figure 5:
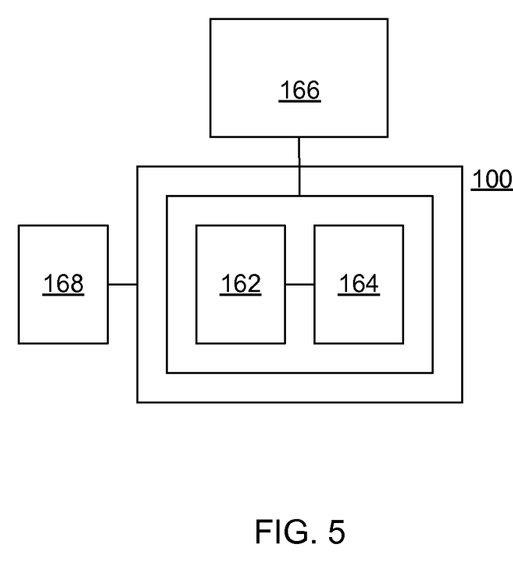
FIG. 5 shows an example of the computing device on which embodiments described above may be implemented.

FIG. 5 shows an example of the computing device 100 on which embodiments described above may be implemented. The computing device 100 may have a display 166, as well as storage devices 162 and a processor 164. These elements may cooperate in ways well understood in the art of computing. In addition, the input devices 168 may be integrated with or in communication with the computing device 100. The display 106 may be a touch-sensitive display that also functions as an input device. The computing device 100 may have any form factor or be used in any type of encompassing device. For example, touch-sensitive control panels are often used to control appliances, robots, and other machines. The computing device 100 may be in the form of a handheld device such as a smartphone, a tablet computer, a gaming device, a headless server, or others.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or devices for storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile devices storing information that allows a program or executable to be loaded and executed. The embodiments and features can be performed on any type of computing device, including portable devices, workstations, servers, mobile wireless devices, and so on.

Embodiments and features discussed above can be realized in the form of information stored in volatile or non-volatile computer or device readable devices. This is deemed to include at least devices such as optical storage (e.g., compact-disk read-only memory (CD-ROM)), magnetic media, flash read-only memory (ROM), or any other devices for storing digital information in physical matter. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of managing audio data in a computing device, the computing device comprising a processor chip, storage, and an audio processor chip, the audio processor chip providing a plurality of signal processing effects, each signal processing effect respectively implementing a different type of audio signal processing algorithm, the method performed by an operating system and/or a kernel-mode component of the computing device, the method comprising:
   accessing association information associating audio types and the signal processing effects, respectively, wherein each audio type is associated with a corresponding one of the signal processing effects;
   providing and managing audio streams that concurrently pass through the audio processor chip for respective applications executing on the computing device;
   receiving from the applications requests to initiate the audio streams, each request having associated therewith an indication indicating a respective audio type provided by the corresponding requesting application, wherein the audio types are associated with the audio streams on a stream-by-stream basis such that different concurrent audio streams of a same application are able to have different respective audio types associated therewith; and
   each time one of the requests is received from one of the applications, initiating the corresponding audio stream by selecting one of the signal processing effects for the audio stream, wherein the signal processing effect is selected according to the audio type indicated by the indication and according to the association information, wherein a first request to initiate a first audio stream is received from a first application, and while the first audio stream is streaming from the first application, a second request to initiate a second audio stream is received from the first application, the first request having associated therewith a first indication indicating a first audio type, the second request having associated therewith a second indication indicating a second audio type, the first audio stream being processed by a first signal processing effect while the second audio stream is being processed by a second signal processing effect.

2. A method according to claim 1, wherein the method enables the audio processing chip to concurrently perform two different types of signal processing for two different applications.

3. A method according to claim 1, further comprising providing a raw signal processing mode that, when requested by an application, causes a corresponding audio stream to have substantially no audio signal processing applied thereto by the audio processing chip.

4. A method according to claim 1, further comprising providing an application programming interface (API) that is used by the applications to initiate and manage the audio streams, the API allowing an application to specify an audio type of a corresponding audio stream.

5. A computing device comprising:
   an audio signal processing device configured to implement a plurality of audio effects by respective audio effect hardware modules; and
   a processor executing applications and providing audio streams for the applications, the processor enabling concurrent processing of the audio streams concurrently flowing through the audio effect hardware modules, the concurrent processing enabled by, for a given application and corresponding first and second audio streams of the given application:
      based on requests from the given application respectively identifying the first and second audio streams, accessing association information associating the audio effects with audio types;
      determining a first audio type for the first audio stream and a second audio type for the second audio stream, and based on the determined first and second audio types and the association information, selecting a first audio effect for the first audio stream and selecting a second audio effect for the second audio stream; and
      based on the first and second selected audio effects, configuring and/or selecting, for the first audio stream, a first audio pathway that includes a first audio effect hardware module corresponding to the selected first audio effect and configuring and/or selecting, for the second audio stream, a second audio pathway that includes a second audio effect hardware module corresponding to the selected second audio effect.

6. A computing device according to claim 5, wherein the applications tag the respective audio streams to allow matching of the audio streams with the audio effect hardware modules.

7. A computing device according to claim 6, wherein audio streams tagged with a same audio type are mixed to form a mixed signal and the mixed signal is passed to an audio effect hardware module that corresponds to the same audio type.

8. A computing device according to claim 5, wherein when the processor determines that an audio stream is a raw type the audio stream is not passed through any of the audio effect hardware modules.

9. A computing device according to claim 8, wherein the audio signal processing device further comprises a signal processing component that processes all of the audio streams including the raw type audio streams, the signal processing preventing audio signals from having a characteristic that will damage the audio signal processing device.

10. A computing device according to claim 5, wherein the processor is configured with logic to prioritize audio effects associated with a given audio type.

11. One or more computer readable storage devices storing information to enable a computing device to perform a process, the computing device comprising a plurality of hardware audio signal processing modes, the process comprising:
   executing an operating system that manages audio paths for audio sources producing respective audio streams having respective audio types;
   receiving first and second requests from an application through an application programming interface (API) of the operating system, the first request indication an association between a first audio stream and a first audio type, and the second request indicating an association between a second audio stream and a second audio type;

determining which of the audio paths will be connected with which of the hardware audio signal processing modes according to information associating the audio types with the hardware audio signal processing modes; and the determining causing a first hardware audio signal processing mode, configured to process audio signals having a first audio type, to be connected to a first audio path, and the determining causing a second hardware audio signal processing mode, configured to process audio signals having a second audio type, to be connected to a second audio path, wherein, based on the first request the first audio stream is assigned to the first audio path and based on the second request the second audio stream is assigned to the second audio path, wherein the first audio path processes the audio streams having the first audio type concurrent with the second audio path processes the audio streams having the second audio type.

12. One or more computer readable storage devices according to claim 11, wherein the audio types include at least two of: voice, music, movie, game, sound effect, and speech.

13. One or more computer readable storage devices according to claim 11, the process further comprising providing a software-based audio processing mode performed by software executing on the processor, and connecting audio streams of a given type of audio type with the software-based audio processing mode for signal processing thereby.

14. One or more computer readable storage devices according to claim 11, wherein the process enables the computing device to concurrently capture and/or produce sound using two different hardware audio signal processing modes for two respective different types of audio types.

* * * * *